Figure 1:
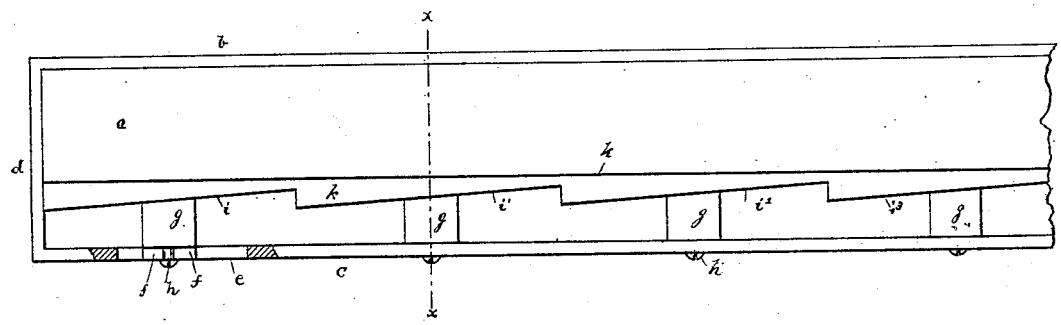

W. T. TILLINGHAST.
Printer's Galley.

No. 208,348. Patented Sept. 24, 1878.

Witnesses.
L. F. Connor.
N. E. Whitney.

Inventor.
William T. Tillinghast
by Crosby & Gregory Atty

UNITED STATES PATENT OFFICE.

WILLIAM T. TILLINGHAST, OF BOSTON, MASSACHUSETTS.

IMPROVEMENT IN PRINTERS' GALLEYS.

Specification forming part of Letters Patent No. 208,348, dated September 24, 1878; application filed July 20, 1878.

*To all whom it may concern:*

Be it known that I, W. T. TILLINGHAST, of Boston, county of Suffolk, State of Massachusetts, have invented an Improvement in Printers' Galleys, of which the following description, in connection with the drawing forming a part thereof, is a specification.

This invention relates to printers' galleys; and consists in the combination, with the galley-frame and side-stick, provided with a series of inclined faces, of a series of shouldered quoins and set-screws to hold them in adjusted position, the said set-screws extending through elongated slots in the side rails of the galley; and, besides acting as set-screws, they also prevent the quoins rising from between the side rail and side-stick, and always maintain the quoins connected with the side rail.

Figure 2:
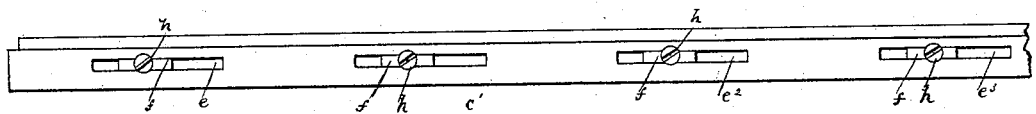
Figure 3:
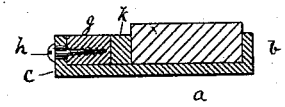

Figure 1 represents, in plan view, a printer's galley constructed in accordance with my invention; Fig. 2, a side elevation thereof; and Fig. 3, a cross-section on the line $x\ x$, Fig. 1.

The galley is composed of a bottom plate, $a$, side rails, $b\ c$, and an end rail, $d$. The side rail, $c$, is provided with a series of elongated slots, $e\ e^1\ e^2$, &c., into which project the shoulders $f$ of the quoins $g$, a screw, $h$, with a head arranged outside of the side rail, extending through the said slot into the quoin, as clearly shown in the section, Fig. 3. These quoins have beveled faces, which co-operate with the inclines $i\ i^1\ i^2$, &c., forming part of the side-stick $k$, which has its straight side pressed against the type. The shoulders $f$, extended into the slots, as shown at the left of Fig. 1, act to guide the quoins in a straight line and hold them down between the side rail and side-stick, assisting the screws $h$, which, without the shoulders, would hold the quoins down and guide them. Each quoin has a set-screw, which, extended through a slot in the side rail, permits the quoin to be quickly adjusted, and to be held securely in adjusted position, thereby making a very simple and effective galley.

I claim—

A printer's galley provided with quoins $g$, having shoulders $f$, which project into and permit the movement of the quoins in longitudinal slots in the side rail, $c$, and combined with screws $h$, all constructed and arranged to operate substantially as described.

In testimony whereof I have signed my name to this specification in the presence of two subscribing witnesses.

WILLIAM T. TILLINGHAST.

Witnesses:
G. W. GREGORY,
N. E. WHITNEY.